United States Patent
Lee et al.

(10) Patent No.: US 9,305,217 B2
(45) Date of Patent: Apr. 5, 2016

(54) OBJECT TRACKING SYSTEM USING ROBOT AND OBJECT TRACKING METHOD USING A ROBOT

(75) Inventors: Dae Ha Lee, Daejeon (KR); Min Su Jang, Daejeon (KR); Seo Hyun Jeon, Gyeonggi-do (KR); Young Jo Cho, Gyeonggi-do (KR); Jae Hong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 867 days.

(21) Appl. No.: 13/545,558

(22) Filed: Jul. 10, 2012

(65) Prior Publication Data

US 2013/0155226 A1  Jun. 20, 2013

(30) Foreign Application Priority Data

Dec. 19, 2011 (KR) .................. 10-2011-0137695

(51) Int. Cl.
| | |
|---|---|
| G06K 9/00 | (2006.01) |
| H04N 7/18 | (2006.01) |
| G06K 9/20 | (2006.01) |
| G06K 9/32 | (2006.01) |
| G06T 7/20 | (2006.01) |

(52) U.S. Cl.
CPC .......... *G06K 9/00664* (2013.01); *G06K 9/2018* (2013.01); *G06K 9/3241* (2013.01); *G06T 7/2006* (2013.01); *G06T 2207/30201* (2013.01); *H04N 7/18* (2013.01)

(58) Field of Classification Search
None
See application file for complete search history.

(56) References Cited

U.S. PATENT DOCUMENTS

| | | | | |
|---|---|---|---|---|
| 7,616,782 | B2 * | 11/2009 | Badawy | 382/107 |
| 7,756,322 | B2 | 7/2010 | Saitou et al. | |
| 8,036,775 | B2 * | 10/2011 | Matsumoto et al. | 700/253 |
| 2005/0244033 | A1 * | 11/2005 | Ekin et al. | 382/103 |
| 2008/0055413 | A1 * | 3/2008 | Hayashi | 348/169 |
| 2010/0157064 | A1 * | 6/2010 | Cheng et al. | 348/169 |
| 2011/0129119 | A1 * | 6/2011 | Eggert et al. | 382/103 |

* cited by examiner

*Primary Examiner* — Kate Luo
(74) *Attorney, Agent, or Firm* — Nelson Mullins Riley & Scarborough LLP; Anthony A. Laurentano; Michael Malone

(57) ABSTRACT

Disclosed are an object tracking system using a robot and an object tracking method using a robot. The present invention provides an object tracking system using a robot and an object tracking method using a robot capable of continuously performing object tracking without missing the corresponding object even when the object deviates from a viewing angle of a camera, in tracking an image based object (person) using a robot.

13 Claims, 5 Drawing Sheets

OBJECT TRACKING SYSTEM USING ROBOT AND OBJECT TRACKING METHOD USING A ROBOT

CROSS-REFERENCE TO RELATED APPLICATIONS

This application claims priority to and the benefit of Korean Patent Application No. 10-2011-0137695 filed in the Korean Intellectual Property Office on Dec. 19, 2011, the entire contents of which are incorporated herein by reference.

TECHNICAL FIELD

The present invention relates to an object tracking system using a robot and an object tracking method using a robot, and more particularly, to an object tracking system using a robot and an object tracking method using a robot capable of continuously performing object tracking without missing the corresponding object even when the object deviates from a viewing angle of a camera, in tracking an image based object (person) using a robot.

BACKGROUND ART

A recent robot industry, which is emerged as one of the core industries that are led by the government, has been greatly developed. In particular, with the development of intelligence robot, new technologies are poured out day by day. In particular, an interaction field with human has been remarkably developed. In order to implement the smooth interaction with human, the robot needs to include basic functions of searching and following persons.

Robot services that allow a robot to recognize a person and follow the person, allow a robot to see an external intruder and track the intruder, or the like, may be considered as essential technologies to implement the interaction between a human and a robot.

Various researches for a method for allowing a robot to track a person have been conducted. Recently, an image tracking technology using color information has been mainly used.

Generally, the image tracking technology using color information constructs targeted colors using color models known as being slightly endured to an illumination change such as a normalized red (R)-green (G)-blue (B) space or a hue (H)-saturation (S)-intensity (I) space, or the like.

However, the color models are well adapted to the uniform illumination change of the targeted object, but cannot be adapted to an irregular change in brightness of the targeted object according to an angle change or a sudden change in brightness between illumination and the targeted object, which may cause a failure in tracking a person.

When the person deviates from the viewing angle of the camera, the robot misses a person having been tracked, which may cause the failure in the tracking of the person.

SUMMARY OF THE INVENTION

The present invention has been made in an effort to provide an object tracking system using a robot and an object tracking method using a robot capable of continuously tracking an object without missing the corresponding object even when the object deviates from a viewing angle of a camera, in tracking an image based object (person) using a robot.

The object of the present invention is not limited to the aforementioned matters and the other objects directly not stated according to the present invention may be clearly understood by those skilled in the art from the following description.

An exemplary embodiment of the present invention provides an object tracking system using a robot, including: an image acquisition unit that acquires images in front of the robot; an object detector that detects an object from the images acquired by the image acquisition unit; a motion pattern calculator that calculates a motion pattern including a distance from the robot and a motion direction of the robot with respect to the object detected by the object detector; a motion pattern storage unit that stores the motion pattern calculated by the motion pattern calculator; and a current position calculator that calculates a current position of the object based on the motion pattern for the object stored in the motion pattern storage unit when the object disappears from the images currently acquired by the image acquisition unit, wherein tracking for the object is performed by moving the image acquisition unit based on the current position calculated by the current position calculator.

The object detector may include: an image frame storage unit that stores an image frame acquired for unit time; and a motion object extractor that compares the image frame stored in the image frame storage unit with the currently acquired image frame to extract a motion object.

The object detector may include: a face region detector that detects a face region for the detected object; a body region detector that detects a body region for the detected object; and a tracking region setting unit that sets a tracking region for the detected object based on at least one of the face region detected by the face region detector and the body region detected by the body region detector.

The face region detector may use a Haar model based on a face skin color model.

The body region detector may detect the body region based on red (R)-green (G)-blue (B) information or hue (H)-saturation (S)-intensity (I) information according to a color of clothes of the object.

The object detector may further include a leg pattern detector that detects a leg pattern within the tracking region set by the tracking region setting unit.

In this case, the motion pattern calculator may calculate the motion pattern based on the leg pattern detected by the leg pattern detector.

The leg pattern detector may be implemented by a laser sensor.

The object detector may further include a tracking region setting unit that sets a tracking region for the detected object. In this case, the motion pattern calculator may calculate the motion pattern for the object within the tracking region set by the tracking region setting unit.

The current position calculator may calculate the current position of the object based on the motion pattern in the previous tracking region for the object stored in the motion pattern storage unit when the object disappears from the images currently acquired by the image acquisition unit.

Another exemplary embodiment of the present invention provides an object tracking method using a robot, including: acquiring images in front of the robot; detecting an object from the images acquired in the acquiring of the images; calculating a motion pattern including a distance from the robot and a motion direction of the robot with respect to the object detected in the detecting of the object; storing the motion pattern calculated in the calculating of the motion pattern; calculating a current position of the object based on the motion pattern for the object stored in the storing of the motion pattern when the object disappears from the images currently acquired in the acquiring of the images; and tracking the object by moving a position for acquiring the images based on the current position calculated in the calculating of the current position.

The detecting of the object may include: storing an image frame acquired for unit time; and comparing the image frame stored in the storing of the image frame with the currently acquired image frame to extract a motion object.

The object tracking method may further include: detecting a face region for the object detected in the detecting of the object; detecting a body region for the object detected in the detecting of the object; and setting a tracking region for the object detected in the detecting of the object based on at least one of the face region detected in the detecting of the face region and the body region detected in the detecting of the body region.

The detecting of the face region may use a Haar model based on a face skin color model.

The detecting of the body region may detect the body region based on red (R)-green (G)-blue (B) information or hue (H)-saturation (S)-intensity (I) information according to a color of clothes of the object.

The object tracking method may further include: detecting a leg pattern within the tracking region set in the setting of the tracking region.

In this case, the calculating of the motion pattern may calculate the motion pattern based on the leg pattern detected in the detecting of the leg pattern.

The object tracking method may further include: setting the tracking region for the object detected in the detecting of the object.

In this case, the calculating of the motion pattern may calculate the motion pattern for the object within the tracking region set in the setting of the tracking region.

The calculating of the current position may calculate the current position of the object based on the motion pattern in the previous tracking region for the object stored in the storing of the motion pattern when the object disappears from the images currently acquired in the acquiring of the images.

According to the exemplary embodiments of the present invention, it is possible to continuously track the object by allowing the robot to detect the motion pattern of the object using the laser sensor, detecting the position of the object based on the detected motion pattern, and then moving the camera to the detected position of the object, when the object deviates from the viewing angle of the camera.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
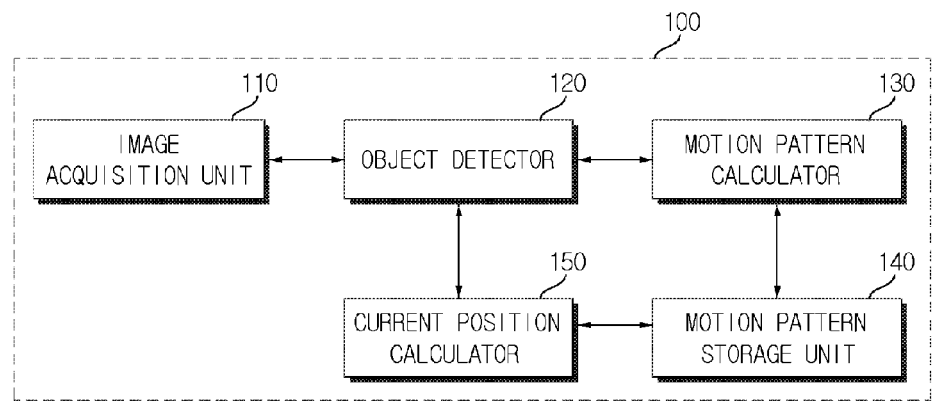
FIG. 1 is a diagram schematically showing an object tracking system using a robot according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, an object tracking system using a robot and an object tracking method using a robot according to an exemplary embodiment of the present invention will be described with reference to FIGS. 1 to 9. Components essential to understand an operation and an action of the present invention will be mainly described in more detail. Throughout the specification, like reference numerals proposed in each drawing denotes like components. In describing the present invention, well-known functions or constructions will not be described in detail since they may unnecessarily obscure the understanding of the present invention.

FIG. 1 is a diagram schematically showing an object tracking system using a robot according to an exemplary embodiment of the present invention.

Referring to FIG. 1, an object tracking system 100 using a robot according to an exemplary embodiment of the present invention may include an image acquisition unit 110, an object detector 120, a motion pattern calculator 130, a motion pattern storage unit 140, and a current position calculator 150.

The image acquisition unit 110 uses a camera mounted in a robot to acquire images in front of a robot. In this case, the image acquisition unit 110 may also acquire general images and infrared images based on a heterogeneous sensor in a type in which a general camera and an infrared (IR) camera are coupled with each other so as to increase quality of the acquired images and efficiency of object tracking.

Figure 2:
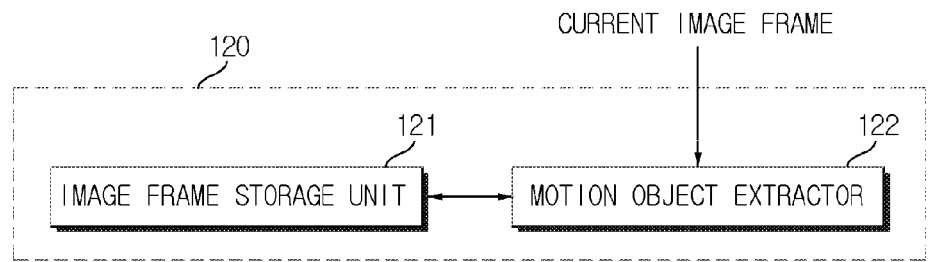
FIG. 2 is a diagram showing an example of an object detector of FIG. 1.

The object detector 120 detects an object from the images acquired by the image acquisition unit 110. To this end, as shown in FIG. 2, the object detector 120 may include an image frame storage unit 121 storing frames of the images acquired for unit time and a motion object extractor 122 extracting the motion object by comparing image frames stored in the image frame storage unit 121 with the currently acquired image frames. In this case, the motion object extractor 122 may estimate regions of interest (ROIs) according to the comparison result of the stored image frame with the current image frame and separate the object by combining the estimated regions of interest. The image of the general camera may estimate a type of an object by sensing the motion and may estimate and extract body and head portions of a person based on the estimated results. In the infrared camera images, the regions of interest may be first separated by using body temperature data of a person and body and head portions of a person may be estimated within the separated region.

In order to solve environmental factors (illumination change, motion change, and shadow) and a spatio-temporal background change in the process of tracking an object, there is a need to first divide a foreground and a background. As a representative method for effectively detecting an object in the object tracking system according to the exemplary embodiment of the present invention, there are a frame difference and a background difference. The frame difference method, which is a method of removing stilled portions and dividing only moving portions by obtaining a change between consecutive frames, can easily remove the background, but has a disadvantage in that the stilled object is also removed. The background difference method can easily divide the moving object excluding the background portion by taking a difference between the background image without the moving object and the input image with the motion, but cannot easily acquire the accurate background image. Therefore, the difference between the image frames stored in the image frame storage unit 121 and the current image frames for a short time interval may be a basic data when measuring or recognizing matters about the movement or the motion of the object. The difference between the same objects from the two image frames may be represented by a moving distance and a direction of an object and motion velocity of an object. The change in two consecutive images having fine light intensity may be represented by a consecutive flow, which is referred to as an optical flow.

Figure 3:
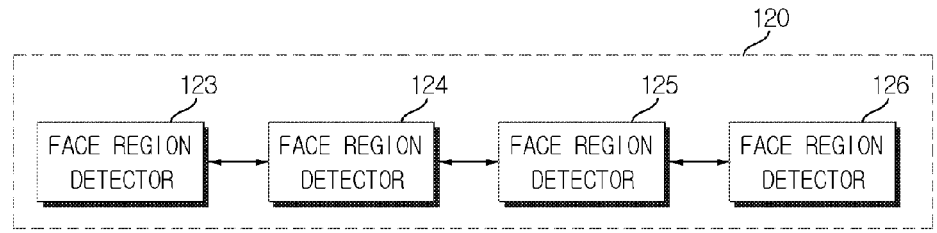
FIG. 3 is a diagram showing another example of an object detector of FIG. 1.

As shown in FIG. 3, the object detector 120 may also include a face region detector 123 detecting a face region of the detected object, a body region detector 124 detecting a body region of the detected object, a tracking region setting unit 125 setting a tracking region of an object based on at least one of the detected face region and the detected body region, and a leg pattern detector 126 detecting a leg pattern within a tracking region set by the tracking region setting unit 125. In this configuration, the leg pattern detector 126 may be implemented by a laser sensor.

The face region detector 123 may use a Haar model according to a skin color model so as to detect the face region. In this case, the Haar face detector can implement rapid detection at an approximate face detection level and thus is used for many systems. The face skin color model divides a region with a face and a region without a face by previously dividing colors of a face region of a person.

The body region detector 124 can detect a body region based on red (R)-green (G)-blue (B) information or hue (H)-saturation (S)-intensity (I) information according to a color of clothes of an object. The body region detector 124 may set a region below a predetermined distance as a body region according to the ratio from a face region detected by the face region detector 123 and may determine color information thereof to store the determined color information as a reference setting value.

The motion pattern calculator 130 calculates a motion pattern including a distance from a robot and a motion direction of a robot with respect to the object detected by the object detector 120. That is, the motion pattern calculator 130 may calculate the moving direction and distance over time with respect to the motion of the object to calculate the motion pattern of the object. In this case, the motion pattern calculator 130 may also calculate the motion pattern based on the leg pattern detected by the leg pattern detector 126.

The motion pattern storage unit 140 stores the motion pattern calculated by the motion pattern calculator 130. In this case, the motion pattern storage unit 140 may also store the leg pattern detected by the leg pattern detector 126 as the motion pattern.

When the object disappears from the current image acquired by the image acquisition unit 110, the current position calculator 150 may calculate the current position of the object based on the motion pattern with respect to the object stored in the motion pattern storage unit 140. In this case, the current position calculator 150 can calculate the current position of the object based on the motion pattern in the previous final tracking region for the object stored in the motion pattern storage unit 140. Based on this, the object tracking system 100 using a robot according to the exemplary embodiment of the present invention can continuously track the object by moving the image acquisition unit 110 based on the current position calculated by the current position calculator 150.

Figure 4:
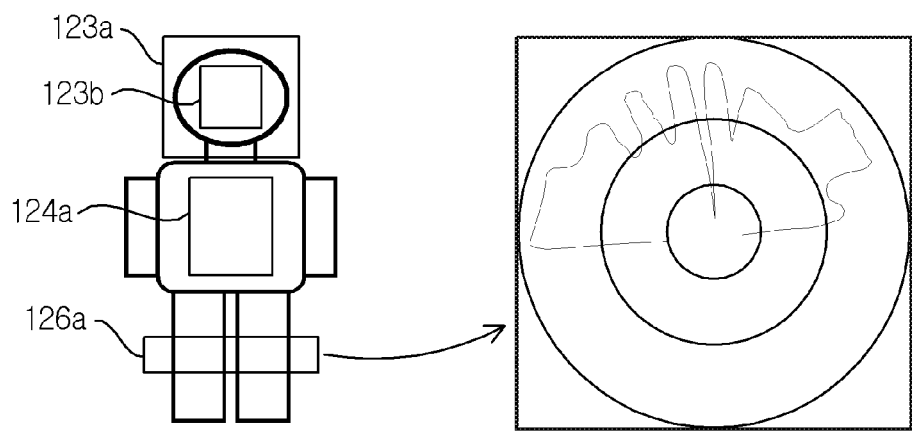
FIG. 4 is a diagram for describing a motion pattern according to the exemplary embodiment of the present invention.
Figure 5:
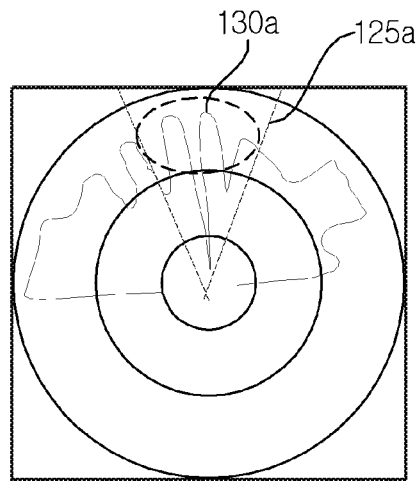
FIG. 5 is a diagram for describing leg pattern detection in an estimation region.
Figure 6:
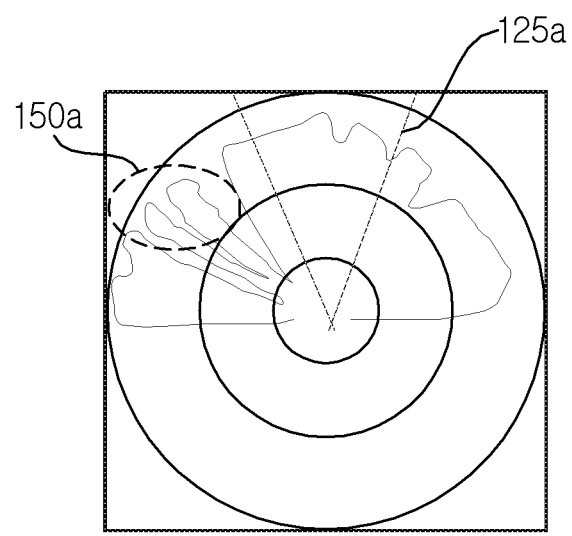
FIG. 6 is a diagram for describing leg pattern detection around a final estimation region.

Although the head/face/body of the person within the viewing angle of the camera can be detected, the person cannot be detected based on the images when the person deviates from the viewing angle. Therefore, as shown in FIGS. 4 and 5, the object tracking system 100 using a robot according to the exemplary embodiment of the present invention detects the object based on a head region 123a or a face region 123b detected by the face region detector 123 based on the images and/or a body region 124a detected by the body region detector 124 when the object is within the viewing angle of the camera, and detects a leg pattern 126a by the leg pattern detector 126 within a tracking region 125a set by the tracking region setting unit 125 after setting the region to be tracked In this case, the detected leg pattern 126a may be stored in the motion pattern storage unit 140 as a motion pattern 130a. When no person is within the viewing angle of the camera, as shown in FIG. 6, the surroundings are searched based on the previous final tracking region to detect a leg pattern 150a. When the leg pattern is detected, it is determined that the object is in the region. As a result, the object tracking system 100 moves the camera to the corresponding position to detect the object. As such, detecting and following a person only based on the images has several difficulties due to a restriction of the camera, but when the restriction matters are supplemented by adding the laser sensor, it is possible to seamlessly perform the object tracking.

Figure 7:
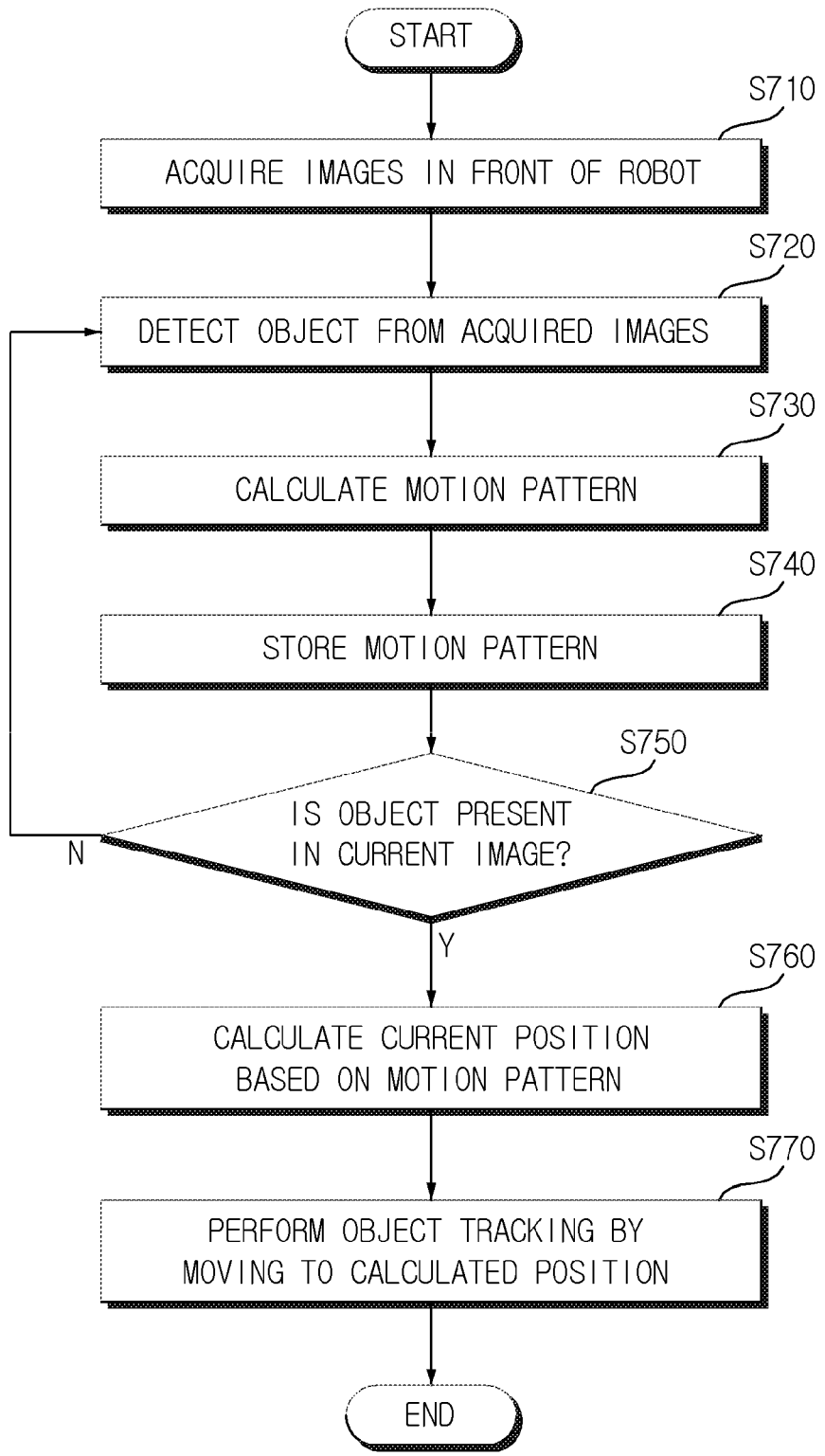
FIG. 7 is a flow chart showing an object tracking method using a robot according to another exemplary embodiment of the present invention.

FIG. 7 is a flow chart showing an object tracking method using a robot according to another exemplary embodiment of the present invention.

Referring to FIGS. 1 to 7, the image acquisition unit 110 acquires the images in front of the robot using the camera installed in the robot (S710).

The object detector 120 detects an object from the images acquired by the image acquisition unit 110 (S720).

Figure 8:
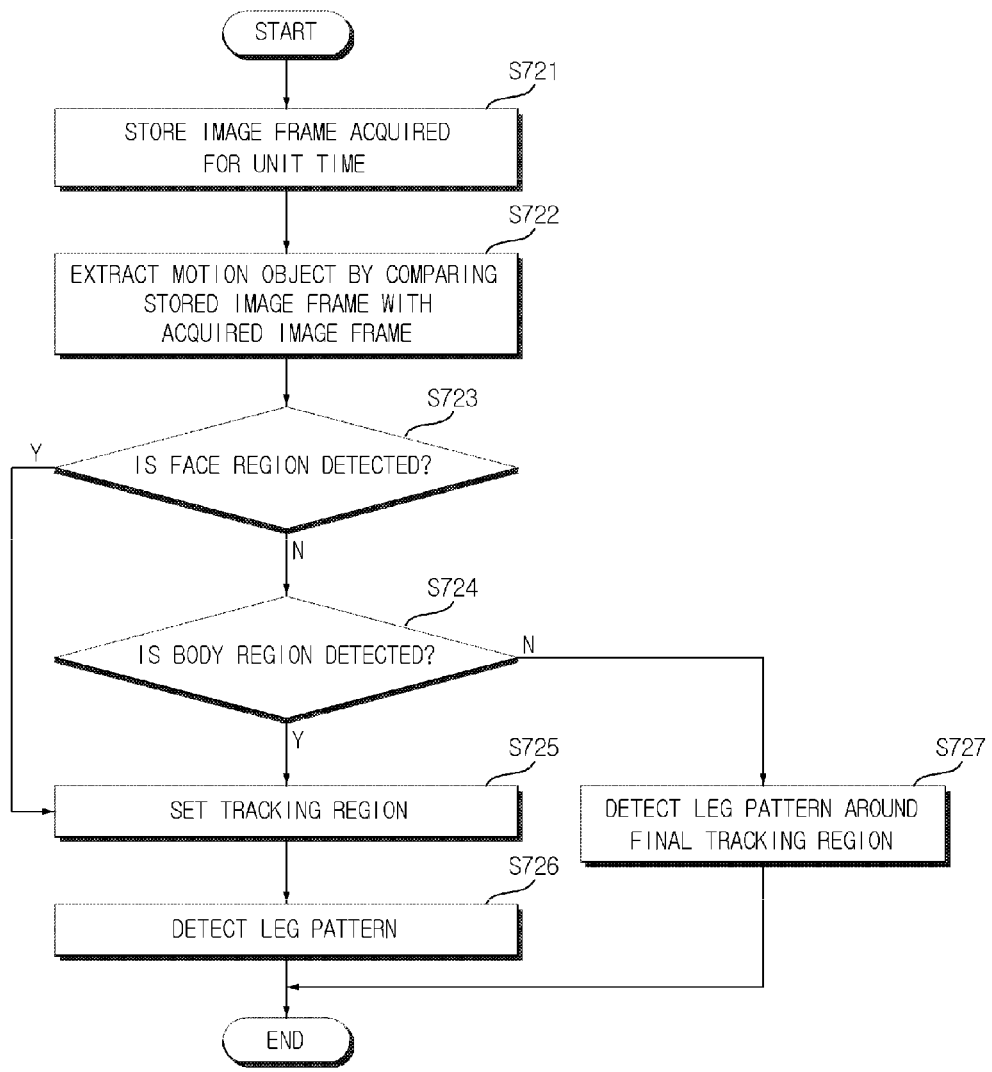
FIG. 8 is a flow chart showing a process of detecting an object of FIG. 7.

In this case, as shown in FIG. 8, the object detector 120 may store the frames of the images acquired for unit time in the image frame storage unit 121 (S721) and extract the motion object by comparing image frames stored in the image frame storage unit 121 with the currently acquired image frames (S722). In this case, the face region detector 123 may detect the face region of the object based on the compared results (S723) and the body region detector 124 may detect the body region of the object based on the compared results (S724). Here, the face region detector 123 can detect the face region using the Harr model based on the face skin color model and the body region detector 124 may detect the body region based on the red (R)-green (G)-blue (B) information or the hue (H)-saturation (S)-intensity (I) information according to the color of clothes of the object.

The tracking region setting unit 125 sets the tracking region for the object based on the face region detected by the face region detector 123 and/or the body region detected by the body region detector 124 (S725).

The leg pattern detector 126 detects the leg pattern of the object within the tracking region set by the tracking region setting unit 125 (S726).

In this case, the motion pattern calculator may calculate the distance from the robot and the moving direction of the robot based on the motion pattern of the object detected by the object detector 120 or the leg pattern detected by the leg pattern detector 126 and may thus store the motion pattern in the motion pattern storage unit 140 (S726).

If the face region for the acquired image is not detected by the face region detector 123 and the body region therefor is not detected by the body region detector 124, the current position calculator 150 may detect the motion pattern or the leg pattern around the previous final tracking region stored in the motion pattern storage unit 140 and determine the position of the current object based on the detected motion pattern or leg pattern.

The motion pattern calculator 130 calculates the motion pattern including the distance from the robot and the motion direction of the robot with respect to the object detected by the object detector 120 (S730).

The motion pattern storage unit 140 stores the motion pattern calculated by the motion pattern calculator 130 (S740).

When the object is not detected in the view of the camera, that is, the tracking region for the current image acquired by the image acquisition unit 110 (S750), the current position calculator 150 may calculate the current position of the object based on the motion pattern stored in the motion pattern storage unit 140 as described above (S760).

As a result, the object tracking system 100 using a robot according to the exemplary embodiment of the present invention may continuously track the object by moving the direction of the image acquisition unit 110 to the position calculated by the current position calculator 150 (S770).

Meanwhile, the exemplary embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An object tracking system using a robot, comprising:
   an image acquisition unit that acquires images in front of the robot;
   an object detector that detects an object from the images acquired by the image acquisition unit;
   a motion pattern calculator that calculates a motion pattern including a distance from the robot and a motion direction of the robot with respect to the object detected by the object detector;
   a motion pattern storage unit that stores the motion pattern calculated by the motion pattern calculator; and
   a current position calculator that calculates a current position of the object based on the motion pattern for the object stored in the motion pattern storage unit when the object disappears from the images currently acquired by the image acquisition unit,
   wherein tracking for the object is performed by moving the image acquisition unit based on the current position calculated by the current position calculator;
   wherein the object detector includes:
      a body region detector that detects a body region for the detected object;
      a tracking region setting unit that sets a tracking region for the detected object based on the body region detected by the body region detector; and
      a leg pattern detector that detects a leg pattern within the tracking region set by the tracking region setting unit; and
   wherein the motion pattern calculator calculates the motion pattern of the object based on the leg pattern detected by the leg pattern detector.

2. The object tracking system of claim 1, wherein the object detector includes:
   an image frame storage unit that stores an image frame acquired for unit time; and
   a motion object extractor that compares the image frame stored in the image frame storage unit with the currently acquired image frame to extract a motion object.

3. The object tracking system of claim 1, wherein the object detector further includes:
   a face region detector that detects a face region for the detected object, and
   wherein the tracking region setting unit sets the tracking region for the detected object based on at least one of the face region detected by the face region detector and the body region detected by the body region detector.

4. The object tracking system of claim 3, wherein the face region detector uses a Haar model based on a face skin color model.

5. The object tracking system of claim 1, wherein the body region detector detects the body region based on red (R)-green (G)-blue (B) information or hue (H)-saturation (S)-intensity (I) information according to a color of clothes of the object.

6. The object tracking system of claim 1, wherein the leg pattern detector is implemented by a laser sensor.

7. The object tracking system of claim 1, wherein the current position calculator calculates the current position of the object based on the motion pattern in the previous tracking region for the object stored in the motion pattern storage unit when the object disappears from the images currently acquired by the image acquisition unit.

8. An object tracking method using a robot, comprising:
acquiring images in front of the robot;
detecting an object from the images acquired in the acquiring of the images;
calculating a motion pattern including a distance from the robot and a motion direction of the robot with respect to the object detected in the detecting of the object;
storing the motion pattern calculated in the calculating of the motion pattern;
calculating a current position of the object based on the motion pattern for the object stored in the storing of the motion pattern when the object disappears from the images currently acquired in the acquiring of the images;
tracking the object by moving a position for acquiring the images based on the current position calculated in the calculating of the current position;
detecting a body region for the object detected in the detecting of the object;
setting a tracking region for the object detected in the detecting of the object based on the body region detected in the detecting of the body region; and
detecting a leg pattern within the tracking region set in the setting of the tracking region,
wherein the calculating of the motion pattern calculates the motion pattern based on the leg pattern detected in the detecting of the leg pattern.

9. The object tracking method of claim 8, wherein the detecting of the object includes:
storing an image frame acquired for unit time; and
comparing the image frame stored in the storing of the image frame with the currently acquired image frame to extract a motion object.

10. The object tracking method of claim 8, further comprising:
detecting a face region for the object detected in the detecting of the object; and
setting the tracking region for the object detected in the detecting of the object based on at least one of the face region detected in the detecting of the face region and the body region detected in the detecting of the body region.

11. The object tracking method of claim 10, wherein the detecting of the face region uses a Haar model based on a face skin color model.

12. The object tracking method of claim 8, wherein the detecting of the body region detects the body region based on red (R)-green (G)-blue (B) information or hue (H)-saturation (S)-intensity (I) information according to a color of clothes of the object.

13. The object tracking method of claim 8, wherein the calculating of the current position calculates the current position of the object based on the motion pattern in the previous tracking region for the object stored in the storing of the motion pattern when the object disappears from the images currently acquired in the acquiring of the images.

\* \* \* \* \*